United States Patent [19]
Rioux

[11] Patent Number: 5,701,173
[45] Date of Patent: Dec. 23, 1997

[54] METHOD AND APPARATUS FOR REDUCING THE UNWANTED EFFECTS OF NOISE PRESENT IN A THREE DIMENSIONAL COLOR IMAGING SYSTEM

[75] Inventor: Marc Rioux, Ottawa, Canada

[73] Assignee: National Research Council of Canada, Ottawa, Canada

[21] Appl. No.: 603,422

[22] Filed: Feb. 20, 1996

[51] Int. Cl.$^6$ .................................. G01B 11/24; G01J 3/50
[52] U.S. Cl. ........................... 356/73; 356/326; 356/376
[58] Field of Search ................................ 356/375, 376, 356/73, 402, 407, 425, 300, 326, 328

[56] References Cited

U.S. PATENT DOCUMENTS

| | | | |
|---|---|---|---|
| 4,627,734 | 12/1986 | Rioux | 356/376 |
| 4,946,281 | 8/1990 | Dell'Eva et al. | 356/376 |
| 5,177,556 | 1/1993 | Rioux | 356/73 |

OTHER PUBLICATIONS

Laser range finder based on synchronized scanners. Marc Rioux, 1 Nov. 1984/vol. 23, No. 21 Applied Optics. pp. 3837–3844.

*Primary Examiner*—K. Hantis
*Attorney, Agent, or Firm*—Neil Teitelbaum & Associates

[57] ABSTRACT

A method and apparatus is provided that lessens the unwanted effects of noise present at the input of an imaging system. By tapping a small portion of a laser input signal containing wavelengths of light corresponding to red, blue, and green of light used to scan the surface to be imaged, the tapped signal is used to generate three beams that correspond to the red, blue, and green content of the laser input signal. Signals generated at the output of the system that correspond to the color of the scanned surface are normalized with the signals that correspond to the three beams generated by the tapped signal. The normalized output signal indicative of the color of the surface is noise reduced; substantially most of any noise present at the input is eliminated from the output of the device.

9 Claims, 3 Drawing Sheets

METHOD AND APPARATUS FOR REDUCING THE UNWANTED EFFECTS OF NOISE PRESENT IN A THREE DIMENSIONAL COLOR IMAGING SYSTEM

Cross-reference is made to a related copending application Ser. No. 08/608,006.

FIELD OF THE INVENTION

This invention relates to three dimensional (3-D) color imaging of a profile of a target surface.

BACKGROUND OF THE INVENTION

Monochromatic 3-D imaging of objects is well known. It has applicability to the accumulation of detailed data on shapes and surface profiles of objects (articles, scenes, and/or persons) to the automatic inspection or assembly of objects, to robotics generally, and to various medical applications.

As of late, 3-D color imaging has been demonstrated; and, interest and advances in this field are gaining momentum. For example, obtaining high resolution color and profile data of an object is of interest to persons cataloging and authenticating works of art. Furthermore, this color and profile data can be stored, electronically transported to a distant location and later viewed at the location, afar from where the imaged object resides; thus, virtual libraries of great works of art, museum objects and the like can be remotely visited and the stored imaged objects viewed from any location equipped with a communications link, such as a telephone line.

It has been known for many years that optical triangulation can yield accurate knowledge of range and of the profile of a target surface. Typical prior U.S. patents that describe implementation of the triangulation principle are U.S. Pat. No. 3,986,774 (Lowery et al.) Oct. 23 1979; U.S. Pat. No. 4,171,917 (Pirlet) Sept. 14 1982; U.S. Pat. No. 4,349,277 (Mundy et al.) Sept. 14 1982; U.S. Pat. No. 4,627,734 (Rioux) Dec. 9 1986; and U.S. Pat. No. 4,701,049 (Beckman et al.) Oct. 20, 1987.

The patents to Pirlet and Rioux teach triangulation configurations in which the surface is scanned by a beam of light. A synchronously scanning receiver images reflected light onto a position sensitive detector, e.g. a CCD (charge coupled device), to generate electrical signals indicative of range deviations of points on the surface from a reference plane.

Beckman et al. also disclose a measuring system employing the triangulation principle. This patent is directed to techniques for improving resolution by varying the cross-section of the measuring beam, and includes a feature of viewing a lighted dot on the target surface at two different angles to discriminate a true reflection from a false one. Mundy et al employ the optical parallax triangulation principle in which a color pattern is projected onto the surface, shifts of wavelength bands being detected on separate detector arrays, these shifts corresponding to the profile of the surface.

U.S. Pat. No. 4,645,347, issued Feb. 24, 1987 to Rioux teaches another method of measuring profile. It uses a converging lens with a mask having two apertures. The spacing between images on a detector represents the range deviation of points on the target surface from a reference plane, e.g. the focal plane of the converging lens.

Alternatively, the range data can be detected by methods other than the triangulation method, such as by time of flight (radar) measurement. A full summary of the various methods of optical ranging is provided in "Active Optical Range Imaging Sensors" by Paul J. Besl, published in Machine Vision and Applications (1988) 1:127–152.

However, none of these known systems also collects data and the color of the target surface.

On the other hand, U.S. Pat. No. 5,177,556 in the name of Rioux issued Jan. 5, 1993 discloses a three dimensional color imaging method and apparatus for determining the color and profile of a target surface. Although Rioux's system is a significant advance over the prior art at that time, and though his system appears to perform its intended function, its functionality and performance are limited in some respects. For example, the system disclosed in U.S. Pat. No. 5,177,556 is adversely affected by noise present at the light source. Thus, a noisy input laser signal will result in output data adversely affected by the noise.

It is therefore an object of the present invention, to attempt to overcome this limitation with the prior art.

SUMMARY OF THE INVENTION

In accordance with the invention, a method is provided for determining the color and profile of a target surface. The method comprises the steps of:

(a) providing a beam of light containing a plurality of wavelengths wherein at least one wavelength is well defined;

(b) separating the beam of light into a first beam and a second beam;

(c) providing at least a portion of the second beam to means for detecting information, for example, in the form of a plurality of intensities or amplitudes related to the spectral content of the beam and for generating signals representative of the information related spectral content of the second beam;

(d) scanning the target surface with the first beam of light;

(e) providing at least a portion of the first beam that has reflected from the target surface to a means for detecting information related to the spectral content of the first beam;

(f) generating signals representative of the spectral content of scattered light from the surface;

(g) determining as a function of the signals generated in step (c) representative of the spectral content of the second beam and the signals representative of the spectral content of light scattered from the surface generated in step (f), normalized values representative of the color of the surface; and, (h) detecting the profile of the surface from at least a portion of the first beam. In accordance with another aspect of the invention a method of determining the color of a target surface is provided comprising the steps of:

(a) providing a beam of light containing a plurality of wavelengths, including at least one well defined wavelength;

(b) separating the beam of light into a first beam and a second beam, the first and second beams;

(c) providing at least a portion of the second beam to a means for detecting the red, green and blue content of the beam, and for generating signals representative of the color of the second beam;

(d) scanning the target surface with the first beam of light;

(e) after the first beam has reflected from the target surface, providing at least a portion of the first beam to a means for detecting the color of the first beam;

(f) generating signals representative of the color of the surface; and (g) determining as a function of the signals generated in step (c) representative of the color of the second beam and the signals representative of the color of the surface generated in step (f), normalized values representative of the color of the surface.

In accordance with another aspect of the invention there is further provided, an optical apparatus for determining the color of a target surface comprising:

(a) means for generating a beam of light containing a plurality of wavelengths;

(b) means for separating the beam of light into a first beam and a second beam;

(c) means for detecting the red, green and blue content of the beam, and for generating signals representative of the red, green, and blue content of the second beam;

(d) scanning means for scanning the target surface with the first beam of light;

(e) means for detecting the red, green and blue content of the first beam and for generating signals representative of the color of the surface;

(f) means for determining as a function of the signals generated in step (c) representative of the color of the second beam and the signals representative of the color of the surface generated in step (e), normalized values representative of the color of the surface.

BRIEF DESCRIPTION OF THE DRAWINGS

Exemplary embodiments of the invention will now be described in conjunction with the drawings, in which.

DETAILED DESCRIPTION

Figure 1:
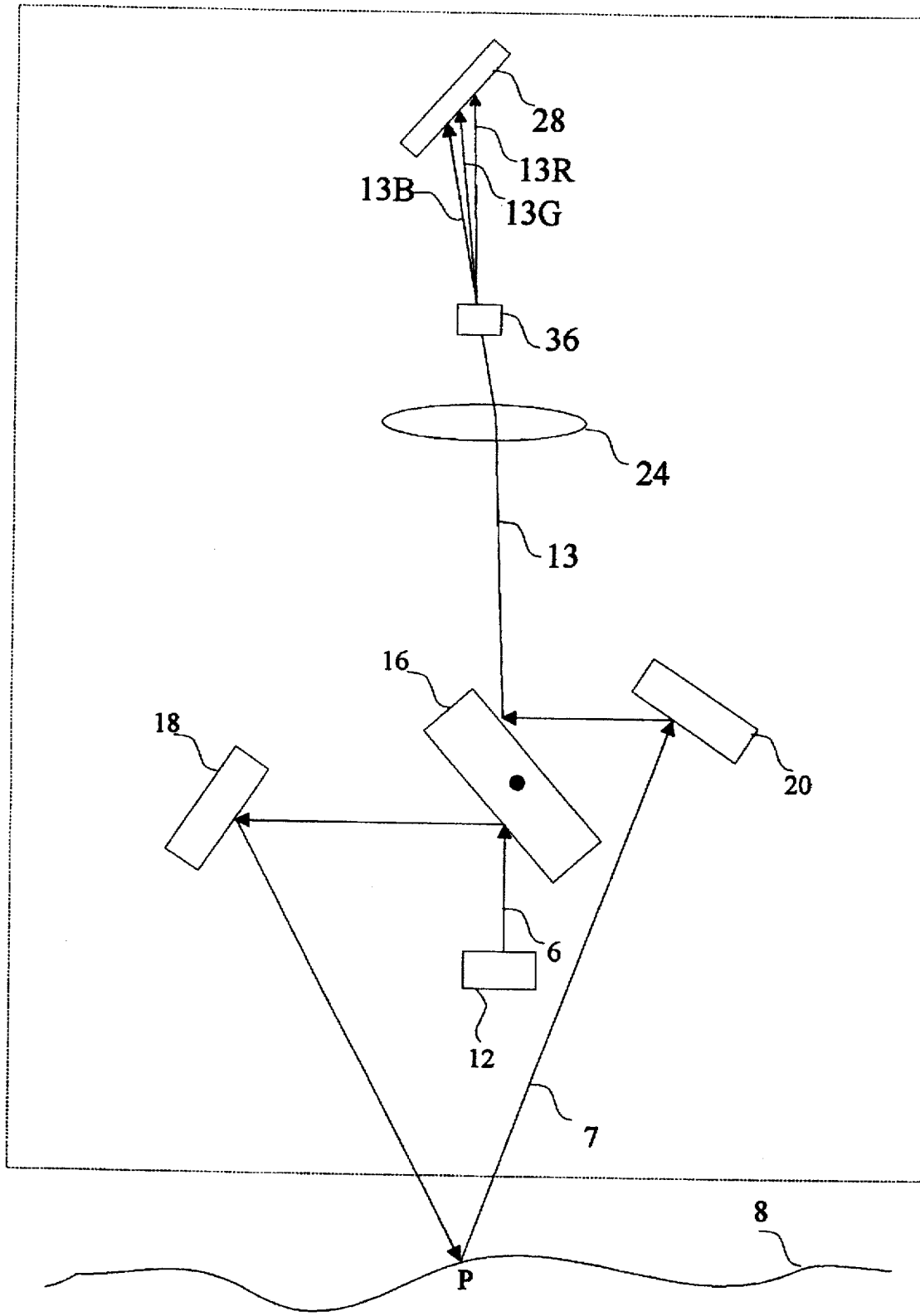
FIG. 1 is a schematic illustration of a prior art three dimensional color imaging system.

FIG. 1 shows schematically a synchronous optical triangulation scanning system that functions in accordance with the teachings of Rioux, U.S. Pat. No. 4,627,734 and is essentially alike in structure to the embodiment illustrated in FIG. 12 of such patent. The system shown in FIG. 1 is also based on a color profile and detection scheme described in U.S. Pat. No. 5,177,556 in the name of Rioux.

Figure 2:
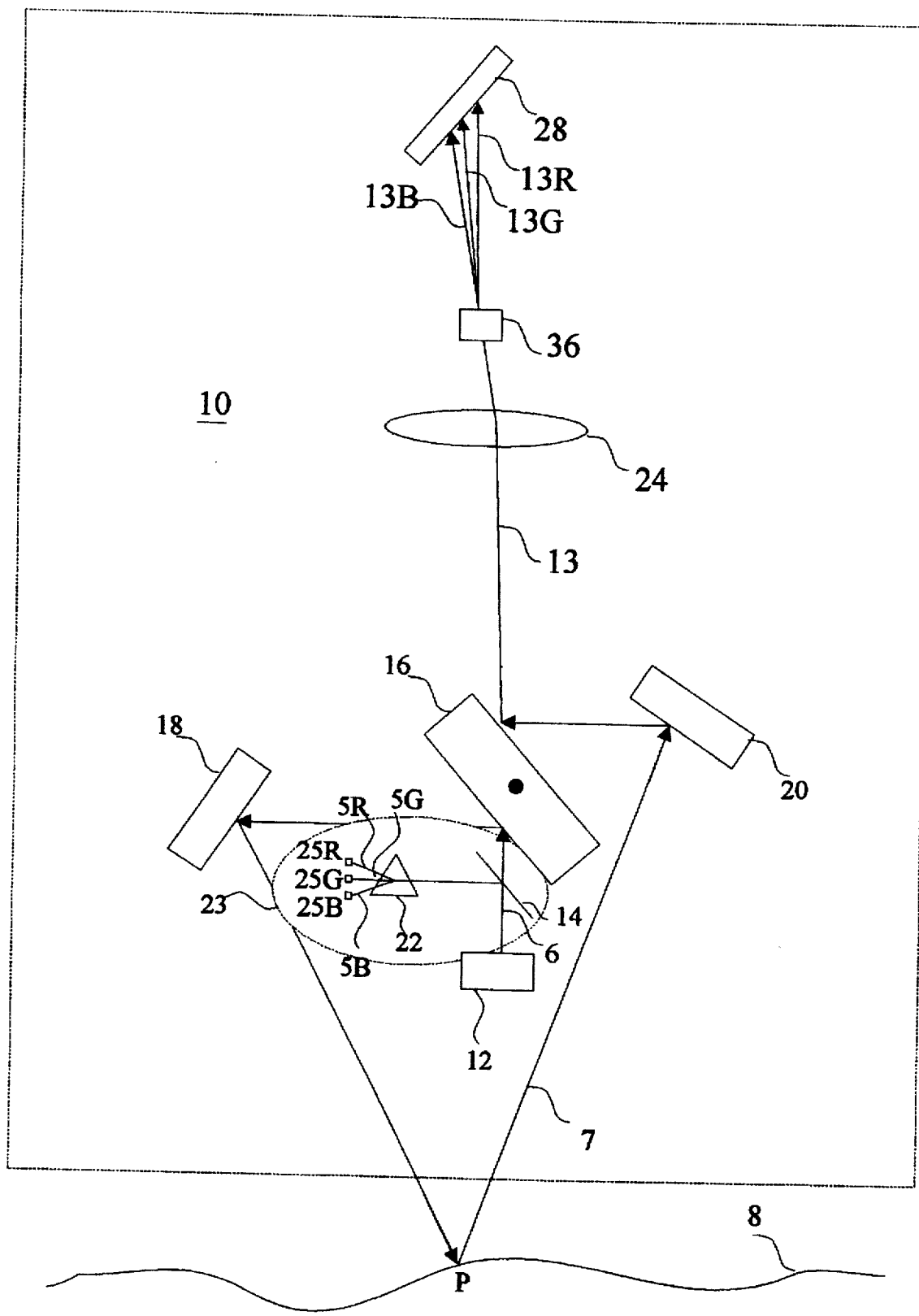
FIG. 2 is a schematic illustration of an embodiment of the invention.

FIG. 2 depicts a scanning system in accordance with the invention that is less sensitive to noise present at the input.

The exemplary embodiment described hereafter is confined to a system having a laser that produces red, green and blue wavelengths of light. Of course, in a more general embodiment a light source can comprise other well defined wavelengths $\lambda_1 \ldots \lambda_N$ wherein complementary detectors are provided for detecting these wavelengths of light $\lambda_1 \ldots \lambda_N$.

Referring now to FIG. 2, a light source 12, in the form of an RGB laser, produces a beam 6 that contains well defined wavelengths of light corresponding to red, green and blue light. A means to reduce the unwanted effect of noise present at the input of the scanning system is provided in the form of a circuit 23 that taps a small portion of the red, green, and blue light generated by the light source 12 for monitoring purposes. A beam splitter 14 performs the tapping function however, most of the generated light is transmitted to the oscillating double-sided mirror 16 as will be described. The circuit 23 also includes a wedge 22 for dispersing the beam into separate beams 5R, 5B, and 5G of the three primary colors red, blue and green. Three separate monitoring detectors in the form of photodiodes 25R, 25B, and 25G are positioned to detect amplitude information corresponding to the intensities of the three separate beams.

In operation the circuit 23 is provided to monitor a small portion of the input light signal generated by the laser 12. By so doing, the small portion of monitored light containing information about the input signal can be used to eliminate noise present at the output that is a function of noise present at the input.

This removal of noise is accomplished through a normalization process that will later be described in greater detail. The three monitoring photodiodes 25R, 25G, and 25B provide values I(R), I(G) and I(B) respectively, representing the intensity value for each color projected to the scene or object 8; these values are stored in a computer memory for the purpose of computing color normalization.

Together with fixed mirror 18, one surface of an oscillating double-sided mirror 16 scans the beam 6 in the X direction and projects it towards an object 8. While the oscillating mirror is a preferred method of scanning, it is possible to achieve the same result by relative translation of the object 8 and the entire 3-D camera 10.

Light 7 received back from a point P on the target surface of the object 8 is returned by the further fixed mirror 20, the opposite side of the oscillating double sided mirror 16 and a lens 24 in the form of a return beam 13 that is imaged onto a position sensitive detector 28. e.g. in the form of a charged coupled device (CCD) array. Interposed in this beam 13 is a device 36 for dispersing the beam 13 into separate return beams 13B, 13G, and 13R of the three primary colors. While the dispersal device 36 can be a simple wedge, it is preferable to use either a double wedge or other device that will achieve a collinear effect at least for one of the beams, preferably the green beam. In other words, the beam 13G will be a straight through continuation of the beam 13. This collinearity is, however not essential.

Figure 3:
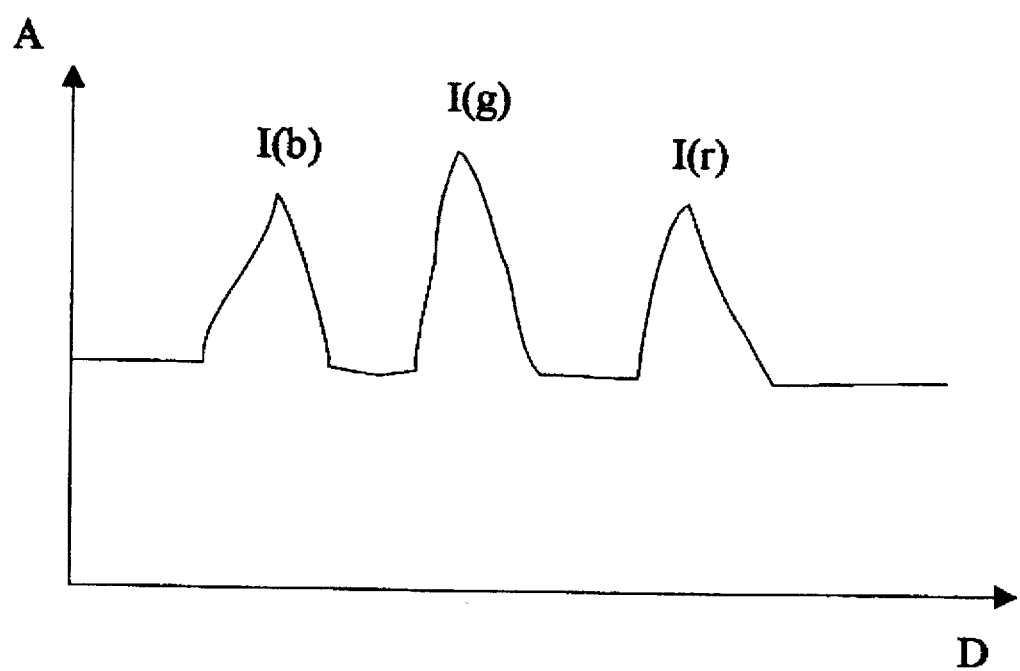
FIG. 3 shows signals generated in the embodiment of FIG. 2.

The detector 28 measures the amplitudes A and the positions D of the respective beams 13B, 13G, and 13R to generate the signals I(r), I(g) and I(b) shown in FIG. 3. The position of any of these signals indicates the range of the point P, i.e., the deviation of the point P in the Z direction from a reference plane Z=0, such plane being perpendicular to the optical axis of the beam 13. The detector 28 is slanted to the optical axis because the focal plane varies with range. Since the positions of the I(r), I(g) and I(b) signals relative to each other do not vary substantially, any one, two or all of these signals can be used to measure the Z deviation. Usually the signal with the greatest amplitude will be chosen for this purpose. If the color of the object is such that one of these signals is absent or is too small to measure, the colors of the two remaining signals can be identified by their spacing from each other. As in the prior art a microprocessor controls the scanning of the mirror 16 while receiving digitizing signals I(r), I(g) and I(b) to produce 3-D color data to be stored. Simultaneously the normalization process occurs in order to reduce the effect of noise present at the input. The normalization is essentially of a ratio of a constant times the detected input light: the detected output light; the process consists of the following calculation:

$$R(N) = K_R[I(r)/I(R)]$$

$$G(N) = K_G[I(g)/I(G)]$$

$$B(N) = K_B[I(b)/I(B)]$$

where R(N), G(N) and B(N) are the normalized values and $K_R$, $K_G$ and $K_B$ are experimentally obtained calibration constants.

Thus, the effect of noise present at the input is substantially reduced at the output by this normalization process and the values R(N), G(N) and B(N) are the normalized noise reduced output signals corresponding to the color of the object 8 being scanned.

Of course, numerous other embodiments may be envisaged without departing from the spirit and scope of the invention.

I claim:

1. A method of determining the color and profile of a target surface comprising the steps of:

(a) providing a beam of light containing a plurality of wavelengths wherein at least one wavelength is well defined;

(b) separating the beam of light into a first beam and a second beam;

(c) providing at least a portion of the second beam to means for detecting information related to the spectral content of the beam, and for generating signals representative of the information related spectral content of the second beam;

(d) scanning the target surface with the first beam of light;

(e) providing at least a portion of the first beam that has reflected from the target surface to a means for detecting information related to the spectral content of the first beam;

(f) generating signals representative of the spectral content of scattered light from the surface;

(g) determining as a function of the signals generated in step (c) representative of the spectral content of the second beam and the signals representative of the spectral content of light scattered from the surface generated in step (f), normalized values representative of the color of the surface; and, (h) detecting the profile of the surface from at least a portion of the first beam.

2. A method of determining the color and profile of a target surface comprising the steps of:

(a) providing a beam of light containing a plurality of wavelengths, including at least one well defined wavelength;

(b) separating the beam of light into a first beam and a second beam, the first and second beams containing substantially the same ratio of red, green and blue light;

(c) providing at least a portion of the second beam to a means for detecting the red, green and blue content of the beam, and for generating signals representative of the red, green, and blue content of the second beam;

(d) scanning the target surface with the first beam of light;

(e) providing at least a portion of the first beam that has reflected from the target surface to a means for detecting the red, green and blue content of the first beam;

(f) generating signals representative of the color of the surface;

(g) determining as a function of the signals generated in step (c) representative of the color of the second beam and the signals representative of the color of the surface generated in step (f), normalized values representative of the color of the surface; and, (h) detecting the profile of the surface from at least a portion of the first beam.

3. An optical apparatus for determining the color and profile of a target surface comprising:

(a) means for generating a beam of light containing a plurality of wavelengths, including at least one well defined wavelength;

(b) means for separating the beam of light into a first beam and a second beam; and for generating signals representative of the red, green, and blue content of the second beam;

(d) scanning means for scanning the target surface with the first beam of light;

(e) means for detecting the profile of the target surface and for detecting the red, green and blue content of the first beam and for generating signals representative of the color of the surface; and (f) means for determining as a function of the signals generated in step (c) representative of the color of the second beam and the signals representative of the color of the surface generated in step (e), normalized values representative of the color of the surface.

4. An optical apparatus as defined in claim 3, wherein the means for separating the beam of light into a first beam and a second beam is a beam splitter that allows a portion of the beam to pass therethrough, and reflects a portion of the beam in a manner such that the spectral content of the first and second beam is substantially identical.

5. An optical apparatus as defined in claim 4, wherein the means for detecting the red, blue and green content of the beams comprises means for separating the beam into three beams of three different primary wavelengths corresponding to red, blue, and green, and means for detecting the intensity of each of the three beams.

6. An optical apparatus as defined in claim 5, wherein the means for detecting the intensity comprise three photodetectors.

7. An optical apparatus as defined in claim 6, wherein the photodetectors are substantially identical.

8. An optical apparatus as defined in claim 3, wherein the means defined in step (f) for determining as a function of the signals generated in step (c) representative of the color of the second beam and the signals representative of the color of the surface generated in step (e), normalized values representative of the color of the surface, comprise a suitably programmed processor.

9. An optical apparatus for determining the color and profile of a target surface comprising the steps of:

(a) means for providing a beam of light containing a plurality of wavelengths wherein at least one wavelength is well defined;

(b) means for separating the beam of light into a first beam and a second beam;

(c) means for detecting information related to the spectral content of the second beam, and for generating signals representative of the information related to the spectral content of the second beam;

(d) means for scanning the target surface with the first beam of light;

(e) means for detecting information related to the spectral content of the first beam after it has reflected off the target surface and for generating signals representative of the spectral content of scattered light from the surface;

(f) means for determining as a function of the signals generated in step (c) representative of the spectral content of the second beam and the signals representative of the spectral content of light scattered from the surface generated in step (e), normalized values representative of the color of the surface; and, (g) means for detecting the profile of the surface from at least a portion of the first beam.

* * * * *